Figure 1:
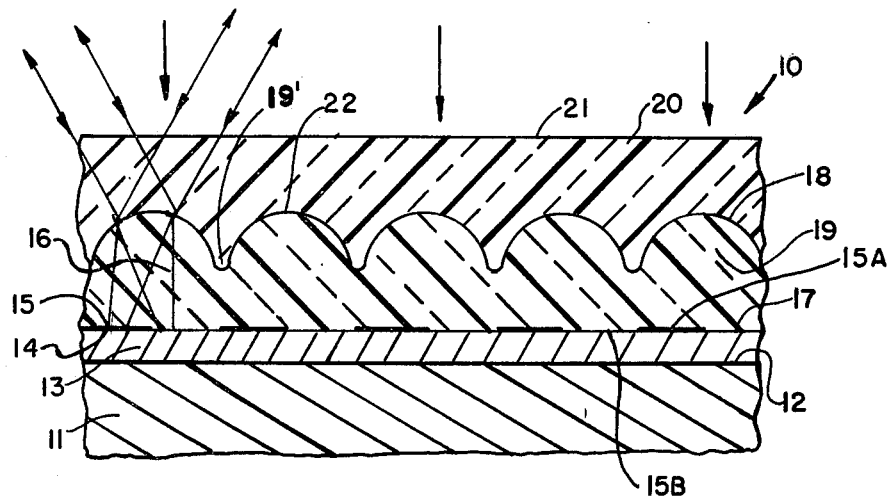

United States Patent [19]

Lemelson

[11] 4,127,693

[45] Nov. 28, 1978

[54] REFLEX REFLECTORS WITH PYRAMID-SHAPED INDENTATIONS

[76] Inventor: Jerome H. Lemelson, 85 Rector St., Metuchen, N.J. 08840

[21] Appl. No.: 719,808

[22] Filed: Sep. 2, 1976

Related U.S. Application Data

[63] Continuation of Ser. No. 548,809, Feb. 10, 1975, abandoned, which is a continuation-in-part of Ser. No. 320,970, Jan. 4, 1973, abandoned, which is a continuation-in-part of Ser. No. 56,047, Jun. 24, 1970, Pat. No. 3,716,445, which is a continuation of Ser. No. 744,911, Jul. 15, 1968, abandoned, which is a continuation-in-part of Ser. No. 489,654, Sep. 23, 1965, Pat. No. 3,396,639, and a continuation-in-part of Ser. No. 360,954, Jun. 11, 1953, Pat. No. 3,220,871.

[51] Int. Cl.² .......................... B32B 3/28; B32B 3/30
[52] U.S. Cl. .................... 428/163; 428/164; 428/167; 428/172; 428/913
[58] Field of Search ............... 428/161, 164, 212, 156, 428/913, 173, 167, , 172, 142, 163, 210, 913; 350/102, 104, 105, 106; 40/125 L, 106.51, 135

[56] References Cited

U.S. PATENT DOCUMENTS

| | | | |
|---|---|---|---|
| 2,149,171 | 2/1939 | Grote | 40/135 |
| 2,330,097 | 9/1943 | Waters | 350/106 |
| 2,592,882 | 4/1952 | Fisher et al. | 350/106 |
| 2,882,413 | 4/1959 | Vingerhoets | 428/173 |
| 2,951,419 | 9/1960 | Lemelson | 350/106 |
| 3,140,340 | 7/1964 | Weber | 350/105 |
| 3,155,764 | 11/1964 | Gill, Jr. | 350/105 |
| 3,661,686 | 5/1972 | Armstrong | 428/164 |

FOREIGN PATENT DOCUMENTS 368,166  7/1906  France ..................................... 428/161

*Primary Examiner*—Marion E. McCamish

[57] ABSTRACT

Structures are provided in lenticular display material such as used in application to automobile headlamp light and the like. The structures include molded, extruded or embossed plastic or glass which is formed with a plurality of irregular surface formations such as cavities, short or elongated protrusions defining irregular surface formations in or against which dirt or dust may collect and form light blocking material which substantially reduces the efficiency of the reflector or display. The new and improved structures provided herein include the provision of a coating or covering sheet of suitable transparent material which retains the interface defined by the irregular surface formations in the lens sheet or reflector so that it may properly continue to function substantially as intended.

4 Claims, 3 Drawing Figures

REFLEX REFLECTORS WITH PYRAMID-SHAPED INDENTATIONS

RELATED APPLICATIONS

This is a continuation application of Application Ser. No. 548,809 filed Feb. 10, 1975, now abandoned, which is a continuation-in-part of application Ser. No. 320,970, now abandoned, filed Jan. 4, 1973 for Lenticular Display, as a CIP of 56,047 filed June 24, 1970 for Reflex Reflecting Sheet and Method now U.S. Pat. No. 3,716,445 granted Feb. 13, 1973, which was filed as a continuation of Ser. No. 744,911 filed July 15, 1968 and now abandoned and which was a continuation-in-part of application Ser. No. 489,654 filed Sept. 23, 1965, for Reflecting Devices, now U.S. Pat. No. 3,396,639, and a C-I-P of Ser. No. 360,954 filed June 11, 1953, now U.S. Pat. No. 3,220,871.

SUMMARY OF INVENTION

This invention relates to new and improved structures in reflecting devices and reflecting sheet material for use out-of-doors such as on highways. In particular, the invention is concerned with structures in reflectors having a plurality of surface formations such as cavities and/or protrusions therefrom which define respective light reflecting or refracting elements which normally face the observer and protrude from the device. It is obvious that when such a structure is provided for out-of-doors use, after a period of time, the collection of dust and dirt in the surface cavities will build up to a point where substantial light directed thereagainst will be absorbed in those localized areas in which the dust and dirt form coating and films.

Accordingly, it is a primary object of this invention to provide new and improved structures in reflectors and highway sign material.

Another object is to provide an improved structure in a light reflecting material or reflector which comprises or includes a member having irregular surface formations which are operable to receive and refract or reflect light directed thereagainst from an external source and which would ordinarily face outwardly from the structure and be exposed to the atmosphere.

Another object is to provide an improved construction in a lens sheet applicable for highway sign use and containing multiple lens formations and a protective covering means therefor which is integral with the lens sheet yet which does not adversely affect its optical characteristics.

Another object is to provide a reflecting device on roadways and formed of a plurality of lens formations in a transparent member having a transparent covering outer layer in contact with the lens formations to protect same against the elements and to prevent dirt from collecting between the lens formations, yet which does not adversely affect the optical characteristics of the lens formation.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 2:
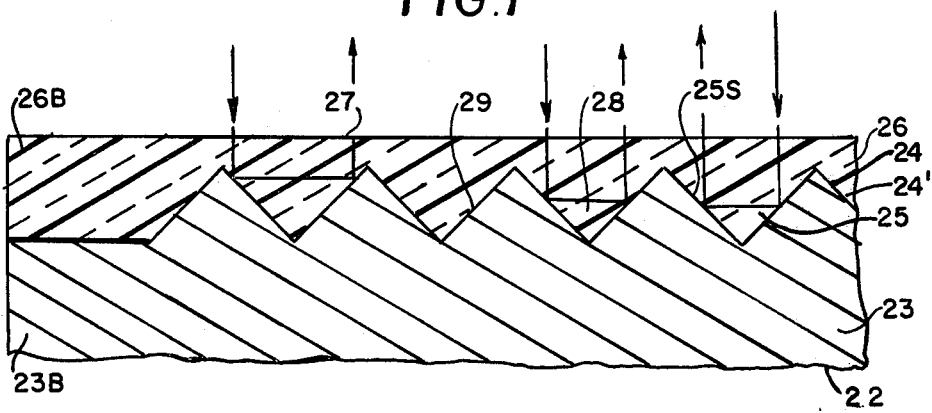
Figure 3:
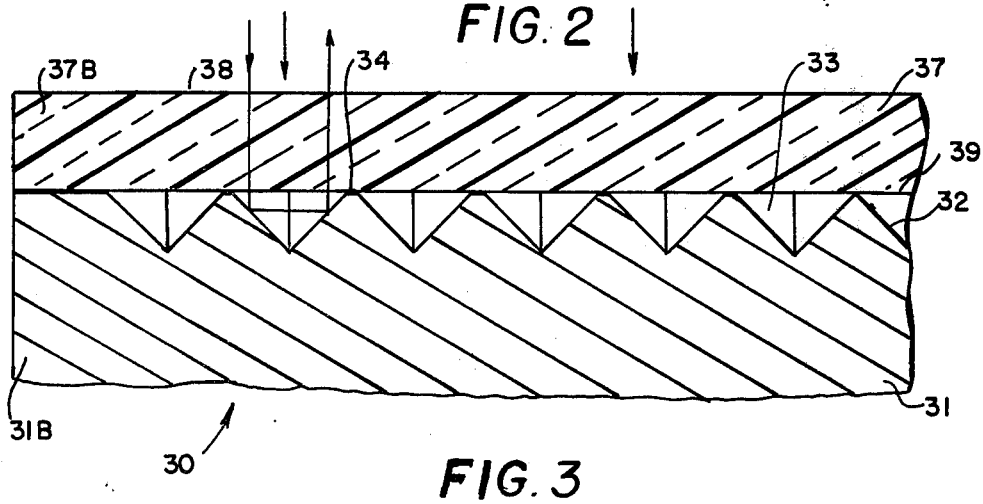

In the drawings:

FIG. 1 is a side cross sectional view of a fragment of a display material which includes a lens sheet portion having a plurality of closely spaced, parallel semi-cylindrical lenses and an over layer or capping sheet for protecting the lenses;

FIG. 2 is a side cross sectional view of a fragment of another display sheet material which is composed of a base member or sheet having a plurality of pyramidally shaped cavities therein defining corner reflectors and an overlay material filling said cavities and defining a flat surface portion of the display; and FIG. 3 is a side cross sectional view of a fragment of a modified form of display of the type shown in FIG. 2.

FIG. 1 illustrates a composite structure 10 defining a display device or reflector for use out of doors, preferably at a location above or adjacent to a roadway along which motor vehicles travel and approach the device during their normal travel on the roadway. The structure 10 is composed of a supporting base 11 of any suitable configuration, and preferably in the form of a sheet or plate or rigid material having disposed on its outermost face 12 a layer 13 of reflex reflecting material such as a layer of high refractive index glass beads disposed in a light transmitting or reflecting layer which layer is operable to reflex reflect light directed against its outer surface 14 back to the vicinity of the source of said light.

Printed or otherwise disposed against the outer surface 14 of the layer 13 are a plurality of indicia means lines or bars 15 forming one or more sets of grids, each of which sets of grids has a particular light absorbing characteristic which is different from any of the other sets of grids. Notation 15 refers to the grid lines in general whereas notation 15A refers to a specific set of grid lines which are spaced-spearated from each other a degree equal to one or more widths of said line and are either interposed between respective grid lines of one or more of additional sets of grids or separated from each other by strip areas 15B which do not contain grid lines.

Assembled with the substrate 11 and layer 13 of reflecting material is a lens sheet 16 of transparent material such as a polymer having a flat rear surface 17 which is in intimate contact with the upper surface 14 of layer 13. The lens sheet has formed in its outer surface 18 a plurality of lens formations 19 which may vary in shape and characteristic but which, in a preferred form of the invention, comprise elongated lenticular proturbances preferably of partial cylindrical shape and extending parallel to the grid lines 15. The formations 19 in sheet 16 are configured to focus respective bands of light directed against the display from the outer surface 21 thereof against any one of the sets of grid lines 15 depending on the angle between the incident light beam striking the display and the front face of the display. Reference is made to U.S. Pat. No. 2,951,419 for further details of a display of the type described which is operable to either generate an intermittent flashing light effect to an observer approaching the display at night in an automobile having its headlights directed thereagainst, assuming that at least one of the sets of grid lines 15 is opaque so as to absorb light when focused thereagainst or to create a changing color reflecting effect if alternate sets of the grid lines are produced of different light transmitting inks.

A display of the type described has an inherent disadvantage when utilized out of doors in that the lens formations 19 provide cavities for indentations 19C between each two lens formations into which cavities may collect dust and dirt which eventually builds up into respective bands of opaque material which serve to block a substantial portion of the light directed against the lens sheet and reflected back therethrough. Accordingly, if the outer surface of the display were to comprise surface 18 of the lens formations 19, depending on the atmosphere surrounding the display, substantial decrease in efficiency thereof may be experienced after a period of time.

In order to account for and prevent the build up of films of dirt and dust in cavity portions 19 of the display of FIG. 1, there is provided a layer 20 of a transparent material such as a plastic resin having an index of refraction which is sufficiently different from the refractive index of the lens sheet 16 as to provide an interface defined by the outer surface 18 of lens sheet 16 which remains substantially as a discrete lens surface between the layers 20 and 16 and retains the lens formation 19 as optically operable elements of a system which receive light passed through the layer 20 and focus said light at or near the rear surface 17 of the lens sheet. The layer 20 has a flat outer surface 21 against which dust may be deposited which is washed off by rain striking said outer surface. If the polymer of which layer 20 is formed contains a suitable anti-static element therein, the layer may be designed to repel dust particles if not to primarily prevent the dust particles from building up thereon as a film.

The rear face 22 of layer 20 is shown in intimate contact with the outer surface 18 of the lens sheet 16. Accordingly, the layers 16 and 20 may be adhesively bonded together after each is separately formed or formed by forming one, preferably the lens sheet 16, then molding or casting the other thereagainst to mold bond the surfaces 18 and 22. In another technique, the lens sheet 16 may be continuously extruded through a die while the covering sheet may either be extruded through a separate die and continuously brought into contact with 16 and bonded thereto or may be extrusion coated in situ against surface 18 on a continuous basis.

In a preferred form, covering layer 20 is preferably a transparent plastic resin having an index of refraction substantially higher than the refractive index of the lens sheet 16.

Materials of which the lens sheet 16 may be made include cellulose acetate butyrate and methyl methacrylate having refractive indexes in the range of 1.46 to 1.50 while the layer 20 may be composed of cellulose acetate, having a refractive index of 1.54; polyamide (1.54–1.56); polyvinyl chloride (1.54–1.56) and polycarbonate (1.6056) resins. Similar combinations of resins may be provided for the structures described hereafter, for lens of base reflector sheet formations and protective capping layers or sheets.

In FIG. 2 is shown another structure in a composite display material 22 for use on or adjacent to a roadway. The material 22 is composed of a base 23 of suitable load carrying and optical characteristics and having formed in its outer surface 24 a plurality of cavities 25 of pyramidal shape each of which cavities has side walls comprising three or more triangular shaped surfaces 25S and configured to define respective retro-reflecting formations, the surfaces 25S of which are either highly smooth or metallized so as to provide suitable reflection of light directed thereagainst.

Notation 26 refers to a covering layer of transparent material having a flat outer surface 27 defining the flat from face of the display and portions 28 thereof extending into the cavities 25. As in the embodiment of FIG. 1, the material of which the covering layer 26 is produced is of a refractive index which is substantially different from the refractive index of the base material 23 such that the interface defined by the outer surface 24 or triangular surfaces 25S composing said outer surface and the rear surface 29 of the layer 26 are in surface abutment with each other either by virtue of separately molding the two components so that they conform to each other or by molding or casting one in situ against the other. By providing covering layer 26 of an index of refraction which is substantially different than that comprising the layer or base 23, the interface between the two layers remains discrete and permits the triangular surfaces of each cavity to cooperate with each other by retro-reflecting light directed into the cavity back to the vicinity of the source along respective paths which are parallel to the incident light. Again, as in FIG. 1, the triangular surface of either the base material 23 or covering layer 26 may be either highly polished or metallized to provide sufficient of the incident light back to the vicinity of the source so that the reflecting device is highly efficient. Notation 23B refers to the border portion of base 23 which is void of embossed or molded cavities against which the border portion 26B of covering layer 26 is sealed.

In FIG. 3 is shown a modified form of the structure of FIG. 2 wherein a composite structure 30 is composed of a base component 31 such as a sheet or other formation having one of its outer surfaces 32 modled or embossed with a plurality of pyramidally shaped, closely spaced cavities 33, the walls of each of which are composed of three or more triangular flat surfaces which define each of the cavities as a separate corner reflector capable of reflex reflecting light directed thereagainst along a path in the direction of the source of the light. Thus the outermost extremities of the member 31 are composed of the lines of ridgelike formations 34 between adjacent cavities and disposed against said ridge lines is the rear face 39 of a protective sheet 37 having a flat outer surface 38. The sheet 37 is made of any suitable transparent plastic or glass and may be bonded or clampingly secured to the base member 31 so as to cover and prevent dirt from entering the cavities 33. The outer surface 38 of protective transparent sheet 37 is void of irregularities and preferably parallel to the surface 39 thereof which contacts the ridge-like surface areas of the base 31. Bonding may be effected at the line or band areas of contact or border portions of the assembly 30. The surfaces of the walls of the pyramidal cavities 33 are preferably light reflecting by virtue of their high smoothness attained by suitably shaping the mold or die which is used to form the cavities. A thin film of metal may also be a vapor deposited against the cavity surfaces prior to assembling the covering transparent sheet 37 with the base 31.

In a modified form of the invention, it is noted that a configuration of the type shown in FIG. 3 may be provided in which the surfaces of the cavities 33 in the base 31 are coated with small glass beads of the type employed in the manufacture of reflex reflecting shape material known as Scotch-Lite produced by the 3M Company of St. Paul, Minn., which beads may be adhesively bonded to said surfaces. If the glass beads are of an index of refraction in excess of 1.90 and preferalby in the range of 2.0–2.2, they will reflex reflect light over a wide angle and the structure of FIG. 3 may be utilized as a reflex reflector, rather than a so-called corner reflector, of improved design. In yet another modified form, the construction of FIG. 3 may be such that certain of the cavities 33 formed in the outer surface 32 of the base 31 may have highly reflective triangular surface formations forming corner reflectors per se therein while others of the cavities may contain high refractive index glass beads coated on their surfaces so as to provide a flecting device which is composed of both corner reflecting portions and relex reflecting portions employing glass beads.

The reflector configuration shown in FIG. 2 may be subject to a number of material variations as set forth in my application Ser. No. 56,047 filed June 24, 1970, and entitled Reflex Reflective Sheeting. For example, the base material 23 may comprise a sheet of flexible, transparent plastic, the surface of which is molded or embossed with the illustrated pyramidal indentations or cavities 25 therein. Materials of which base sheet 23 may be made may comprise flexible plasticized polyvinyl chloride, ethylene vinyl acetate, polyvinyldiene chloride, butadiene styrene and ionomer resins. In a typical configuration, the sheet may vary in thickness from 0.005 to 0.075 inch and the cavities or channels may extend to approximately hald the thickness of the sheet in depth and having wall surfaces which are highly reflective so as to provide each of the cavities as a suitable so-called corner reflector. The covering layer 26 may either be separately molded of a similar flexible plastic which is transparent, light passed therethrough and may be bonded or otherwise secured to the base sheet 23 in such a manner as to not destroy or eliminate the interfacial surface of the surfaces of thw walls of the cavities 25 in the base so that they may function as suitable reflectors of light directed against the outer surface 27 of protective layer 26. The interface may also be defined by a thin layer of metal film vacuum deposited against the surfaces of the cavity walls. If a thin film of metal is so deposited, then the protecting overlayer 25 may be molded or cast against the base sheet 23 with the metallized interface remaining to reflex reflect light directed against the outer surface 27 back to the vicinity of the source of such light. Protective overlayer 26 may be composed of any of the described plastic materials including, as may the base 23, such additional materials or transparent silicone resins, light transmitting polyamides, light transmitting expoxis and the like. Total thickness of such a combination sheet material is preferably in the range of 0.005 to 0.10 inch.

Further modification and improvements in the reflecting structures hereinbefore described include the provision of an ultraviolet light absorbing chemical in either or both the covering plastic layer or sheet and the lens sheet or layer containing corner reflecting, pyramidal cavities as described to absorb ultraviolet light from the sun to prevent degradation and discoloration in the plastic. Also, a suitable known anti-static electricity forming agent may be added to or coated on the flat outer surfaces of the covering layer or sheet to prevent the build up of layers of dust thereon which would reduce the efficiency of the display and its ability to receive, transmit and reflect light therefrom.

In FIG. 3 notation 31B refers to one of the underformed border protions of the base 31 and 37B to that portion of the protective sheet 37 which is sealed to the flat surface of the base 31B which surrounds the base 31 adjacent to and defining all the border portions thereof.

In a preferred form of the invention, base sheet 31 may be 0.005 to 0.0100 inch thick, the cavities varying in depth from 0.003 to 0.075 inch and numbering from 100 to 900 per square inch.

What is claimed is:

1. A reflex reflector device comprising:

a base sheet formed of a first flexible plastic resin, said base sheet having a series of cavities, each of said cavities being shaped to define a corner reflector and having a plurality of planar surfaces defining a pyramid-shaped indentation wherein the base portion of said pyramid-shaped indentation is open to the surface of said base sheet, and the apex of said pyramid-shaped indentation extending into said base sheet, and a covering sheet made of a light transmitting second flexible plastic resin which is formed with a series of complementary pyramid-shaped projections having a plurality of complementary planar surfaces, said covering sheet being disposed onto said first base sheet whereby the complementary pyramid-shaped projections fill the complementary pyramid-shaped indentations in said base sheet in a manner whereby said plurality of planar surfaces of said indentations are contacted by the corresponding complementary planar surfaces of said projections of said covering sheet, said complementary planar surfaces of said cavities and projections defining at the interface therebetween a discrete reflecting surface so that a beam of light striking said reflecting surface will be reflected from said reflecting surface back in the direction of the source of said light beam, said base sheet and said covering sheet being made of a respective plastic resin which has different index of refraction so as to retain the reflectivity of the interface surfaces between said first and second sheets.

2. The reflex reflector as defined in claim 1 wherein said transparent layer has an index of refraction which is higher than the refractive index of said base sheet.

3. The reflex reflector as defined in claim 1 wherein said transparent layer includes anti-static element to repel particles of dust.

4. A display device as defined in claim 1 and including means for bonding the plannar surfaces of said projections to the plannar surfaces of said indentations.

* * * * *